Figure 1:
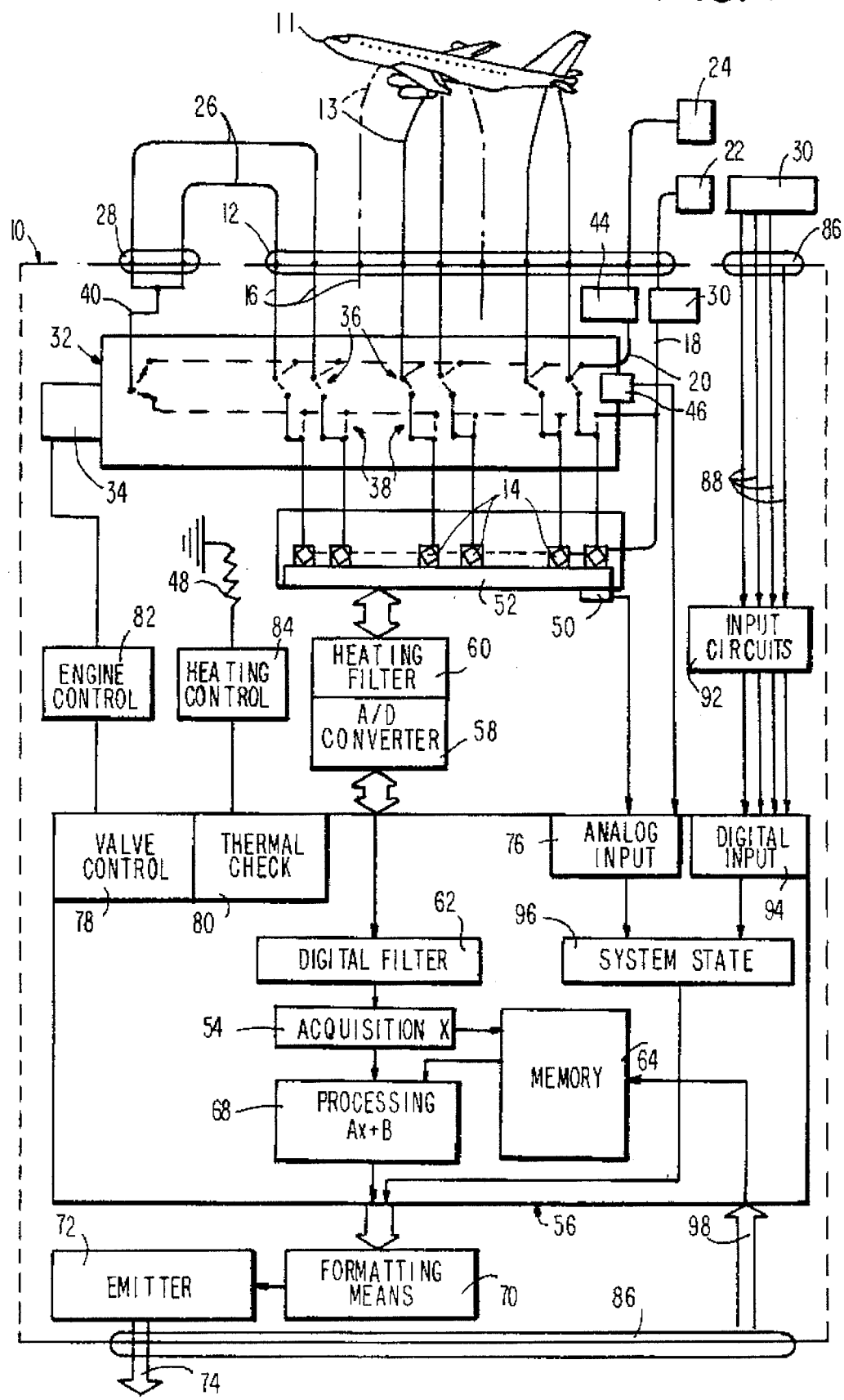

United States Patent [19]

Lopez

[11] Patent Number: 5,537,869

[45] Date of Patent: Jul. 23, 1996

[54] INTEGRATED MULTICHANNEL PRESSURE MEASURING SYSTEM AND CORRESPONDING MEASURING PROCESS

[75] Inventor: Christian Lopez, Le Castera, France

[73] Assignee: Aerospatiale Societe Nationale Industrielle, Paris Cedex, France

[21] Appl. No.: 217,369

[22] Filed: Mar. 24, 1994

[30] Foreign Application Priority Data

Mar. 25, 1993 [FR] France ................... 93 03439

[51] Int. Cl.$^6$ .................................. G01C 21/00
[52] U.S. Cl. ................... 73/178 R; 73/132; 73/717
[58] Field of Search ................... 73/178 R, 182, 73/183, 716, 717; 364/550, 557, 571

[56] References Cited

U.S. PATENT DOCUMENTS

| | | |
|---|---|---|
| 4,399,515 | 8/1983 | Gross . |
| 4,483,178 | 11/1984 | Miille . |
| 4,715,003 | 12/1987 | Keller et al. . |
| 4,732,043 | 3/1988 | Bell et al. ................... 73/708 |
| 4,945,768 | 8/1990 | Sorrells ................... 73/717 X |
| 4,958,520 | 9/1990 | Trommler et al. ................... 73/721 X |
| 5,293,137 | 3/1994 | Travis et al. ................... 73/717 X |

FOREIGN PATENT DOCUMENTS

| | | |
|---|---|---|
| 0086462 | 8/1983 | European Pat. Off. . |
| 0169414 | 1/1986 | European Pat. Off. . |
| 0409213 | 1/1991 | European Pat. Off. . |
| 2197957 | 6/1988 | United Kingdom . |

OTHER PUBLICATIONS

SENSORS AND ACTUATORS, vol. A21, No. 1/3, pp. 79–83, Feb. 1990, S. Ansermet et al, "Cooperative Development . . . ".

*Primary Examiner*—Richard Chilcot
*Assistant Examiner*—Elizabeth L. Dougherty
*Attorney, Agent, or Firm*—Michael N. Meller

[57] ABSTRACT

In order to study the aerodynamic phenomena occurring around structures of an aircraft, particularly during ground and flight tests, an automated multichannel pressure measuring system is proposed. This system, which is entirely contained in a very small box or case (10), incorporates the pressure transducers (14) and processing software (54) for the approximate values supplied by the transducers. A multichannel or multiway valve (32) places the system in a blowing or blasting state purging the circuits in the case or rain. In this state, it is possible to check the satisfactory operation of the transducers and carry out their calibration. Therefore, the frequency with which recalibration of the system has to take place in the laboratory is greatly reduced. Advantageously, the transducers (14) are temperature-controlled.

26 Claims, 3 Drawing Sheets

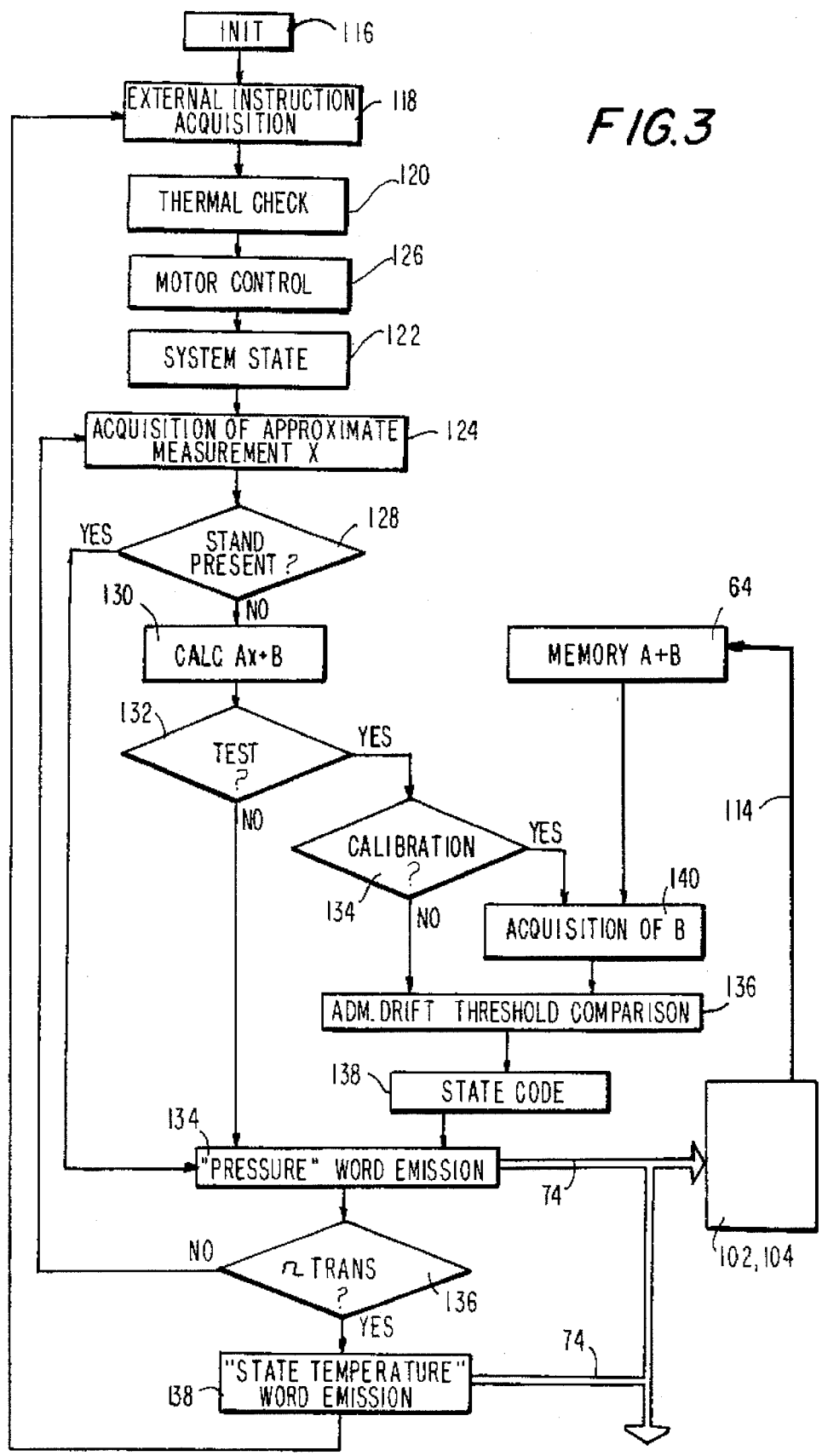

INTEGRATED MULTICHANNEL PRESSURE MEASURING SYSTEM AND CORRESPONDING MEASURING PROCESS

DESCRIPTION

The invention relates to an integrated system for simultaneously performing in an automatic manner pressure measurements at different points of a structure such as an aircraft structure being tested. The invention also relates to the process used by this system.

The invention is applicable to all structures on which differential pressure measurements have to be performed, both during testing and for the control of industrial processes. Among the possible applications, more particular reference will be made to flight trials and wind tunnel tests on aircraft or parts thereof, engines and various equipments.

The study of the aerodynamic phenomena occurring round the structures of aircraft require a precise knowledge of the surrounding pressures at a large number of points. Initially this study is carried out on the ground, during tests in the wind tunnel or on a test stand for the engines. It is then continued during flight trials in order to further define the results.

In order to study these aerodynamic phenomena, at present pressure measurements are performed by means of two different equipment types.

A first known equipment type comprises a single sensor or transducer and an electropneumatic mechanism making it possible to sequentially switch the transducer to each of the pressures to be measured. The implementation of this equipment requires its association with external systems ensuring the processing of the approximate measurements, as well as the checking and control of the equipment with the aid of specific software.

This first known equipment type suffers from a certain number of disadvantages resulting from the use of a single pressure transducer associated with an electropneumatic switch and the absence of a processing, checking and control system integrated into said equipment.

Thus, movements of parts ensuring the automatic switching in the electropneumatic switch create natural leaks during the measurement. These leaks give rise to measurement errors and can disturb the systems during tests such as the anemometric systems of an aircraft.

In addition, said equipments are not adapted to industrial use and their implementation and their maintenance are very difficult and expensive as regards to labour hours. Moreover, they have a limited reliability, whilst their life and operational reliability are very limited (roughly one to two weeks), which makes it necessary to have specific installation and removal zones, which leads to the aircraft being immobilized in the case of flight trials.

Finally, said equipments do not permit an automatic calibration of the system, i.e. the taking into account of zero offsets of the transducer. They also have no software aiding maintenance and inspection, or blowing means permitting the injection of air into the pressure intakes in order to purge from the latter water which can freeze at high altitudes, so that they are not operational when it is raining.

A second known equipment type has the same number of transducers as there are measuring channels, as well as an electronic switch permitting the scanning in turn of each of the channels. As in the first known equipment type, said equipments have no control or measurement processing system. In order to be operable, they must therefore be associated with external processing, checking and control systems equipped with specific software.

These equipments also suffer from the disadvantages resulting in part from the apparatus type used therein and the need of associating them with external systems in order to ensure their operation and control.

Thus, the different functions performed by these equipments are obtained by pneumatic controls, which requires the presence of a high pressure compressed air source and the routing of high pressure pipes to the transducer. Moreover, the metrological quality of static scanners is difficult to maintain in an aeronautical environment, so that frequent recalibration thereof is necessary.

Moreover, like the first equipment type, said equipments are not suitable for industrial use and do not comply with the standards in force in aeronautics. They also do not permit a calibration in automatic manner of the transducers or the association with the system of maintenance and checking-assisting software.

Finally, with such equipment, the putting into place of elaborate functions requires a data processing system equipped with specific software and imposes the presence of a trained operator. Therefore operation cannot be entirely automatic.

The invention relates to a multichannel pressure measuring system, whose original design makes it possible to perform pressure measurements at different points of a structure such as an aircraft, both on the ground and in flight, in a particularly simple, reliable and automatic manner without any need to add external data processing systems or have a trained operator, whilst guaranteeing a life and operational reliability of sufficiently high level to ensure that any flight test campaign can be performed without grounding the aircraft.

According to the invention, this result is obtained by means of a pressure measuring system having n measuring channels with, within the same box, n pressure transducers respectively connected on the n measuring channels to a first pneumatic connector, and multiplexing means able to scan in turn the n transducers, characterized in that the box also contains means for processing the pressure measurements supplied by the transducers through multiplexing means, able to multiply each measurement by a first sensitivity correcting coefficient A and able to add to each measurement a second zero offset correcting coefficient B and means for supplying to the outside informations including the corrected pressure measurements supplied by the processing means.

As a result of the integration into the same case or box of the pressure transducers, switching means making it possible to scan said transducers, processing means for the measurements supplied by the transducers and means for supplying to the outside informations including the corrected pressure measurements, an entirely automatic, autonomous system is obtained, which can be used by an untrained operator and which can easily be installed on board an aircraft during ground and flight testing.

Advantageously, the maintenance and analysis of a possible fault are facilitated by the integration within the measurement system box of means for the auto-monitoring of the state of the system. The informations supplied to the outside by the supply or delivery means then include informations supplied by said auto-monitoring means representative of the state of the system.

In a preferred embodiment of the invention, the transducers are differential pressure transducers having a common pressure reference line. More specifically, the differential pressure transducers are advantageously constituted by membrane transducers located in the vicinity of heating means actuated by temperature control means sensitive to signals supplied by a temperature probe. The informations supplied to the outside by the supply means then include the temperature of the transducers.

The use of this type of transducer makes it possible to eliminate any risk of leaks and consequently considerably improves the accuracy of the measurement. Moreover, the temperature control avoids the significant ambient temperature variations suffered by an aircraft during flight trials from causing errors with regards to the measurements. However, the supply means display the temperature of the transducers, so that the operator can, if necessary, perform a correction on the measurement.

In the preferred embodiment of the invention, a motorized multichannel or multiway valve is positioned upstream of the transducers on the pressure line, so as to be able to occupy a measurement position in which the input of each measuring channel is connected to a corresponding transducer, and a blowing position in which the input of each measuring channel communicates with a blowing line connected to an external, dry compressed air generator and in which the input of each transducer is connected to the common pressure reference line.

The existence of the blowing position makes it possible, in rainy weather, to inject compressed air into the aircraft pressure intakes, so as to purge therefrom water which may freeze at high altitudes. It is therefore possible to carry out measurements no matter what the weather prevailing during flight trials.

Preferably, the system also has a second pneumatic connector connectable to unused measuring channels of the first pneumatic connector. This second pneumatic connector communicates with the common pressure reference line when the motorized multichannel valve occupies its measuring position and is isolated when the valve occupies its blowing position. The existence of unused measuring channels makes it possible to retain in reserve a number of replacement transducers usable in the case of a failure of other transducers, which greatly simplifies a subsequent maintenance operation.

In order that the air admitted by the common pressure reference line is indeed dry, drying means are located in said line. These drying means incorporate a drying product, which is automatically regenerated by using heating means when the system is rendered live.

In order to improve the quality of the signal-to-noise ratio for each of the transducers, the switching means are connected to pressure measurement acquisition means across analog filtering means, an analog-digital converter and digital filtering means.

In the preferred embodiment of the invention, the system comprises automatic calibration means making it possible to gather, for each of the pressure transducers, the second zero offset correcting coefficient B, for which the corrected pressure measurement supplied by the processing means is zero when the motorized multichannel valve occupies its blowing position.

The automatic calibration means then advantageously incorporate means for limiting the second coefficient B to a maximum given value, which e.g. corresponds to ±15% of the measurement range of the system.

The latter feature makes it possible to detect the inoperative pressure transducers, which still have a zero offset above ±15% of the measuring range of the system. In order to carry out this detection, the system has testing means which compare, for each of the pressure transducers, the corrected pressure measurement supplied by the processing means when the motorized multichannel valve occupies its blowing position with an admissible offset threshold. These testing means transmit to the supply means an invalidity information with respect to the measurement supplied by each transducer for which the corrected pressure measurement exceeds this threshold. The admissible measurement threshold can be fixed at ±0.5% of the measurement range.

Preferably, the system also comprises control means able to place it in at least one of the following states:

- a measuring state, in which the processing means are used and the multichannel valve occupies its measuring position,
- a blowing state, in which the multichannel valve occupies its blowing position,
- a test state for association with the blowing state and in which the processing means and the testing means are actuated and
- a calibration state for association with the blowing state and the test state and in which the automatic calibration means are actuated.

The box also has a digital calibration link, which can be connected in the laboratory to a computer of an external calibration stand, which also has a pressure generator connectable to the measuring channels of the system, the digital calibration link being connected, within the box, to storage means for the first coefficient A and the second coefficient B which can be computed by the computer when the transducers are subject to predetermined pressure values.

In this case, the control means also make it possible to place the system in a calibration state, in which the pressure measurements supplied by the transducers are directly transmitted to the supply means without passing via the measuring means. The supply means are then connected to the calibration stand computer.

In the preferred embodiment of the invention, the control means incorporate control lines able to receive logic instructions from at least one switch located outside the box.

The invention also relates to a process for measuring the pressures prevailing on n measuring channels, consisting of simultaneously performing, within the same box, an approximate measurement of each pressure and for supplying in turn to the outside of said box informations representative of said measurements, characterized in that prior to supplying to the outside of the box the informations representative of the pressure measurements, each approximate measurement is processed by multiplying it by a first sensitivity correcting coefficient A and by adding to it a second zero offset correcting coefficient B.

The invention is described in greater detail hereinafter relative to a non-limitative embodiment and the attached drawings, wherein show:

FIG. 1 diagrammatically an integrated multichannel pressure measuring system according to the invention.

Figure 2:
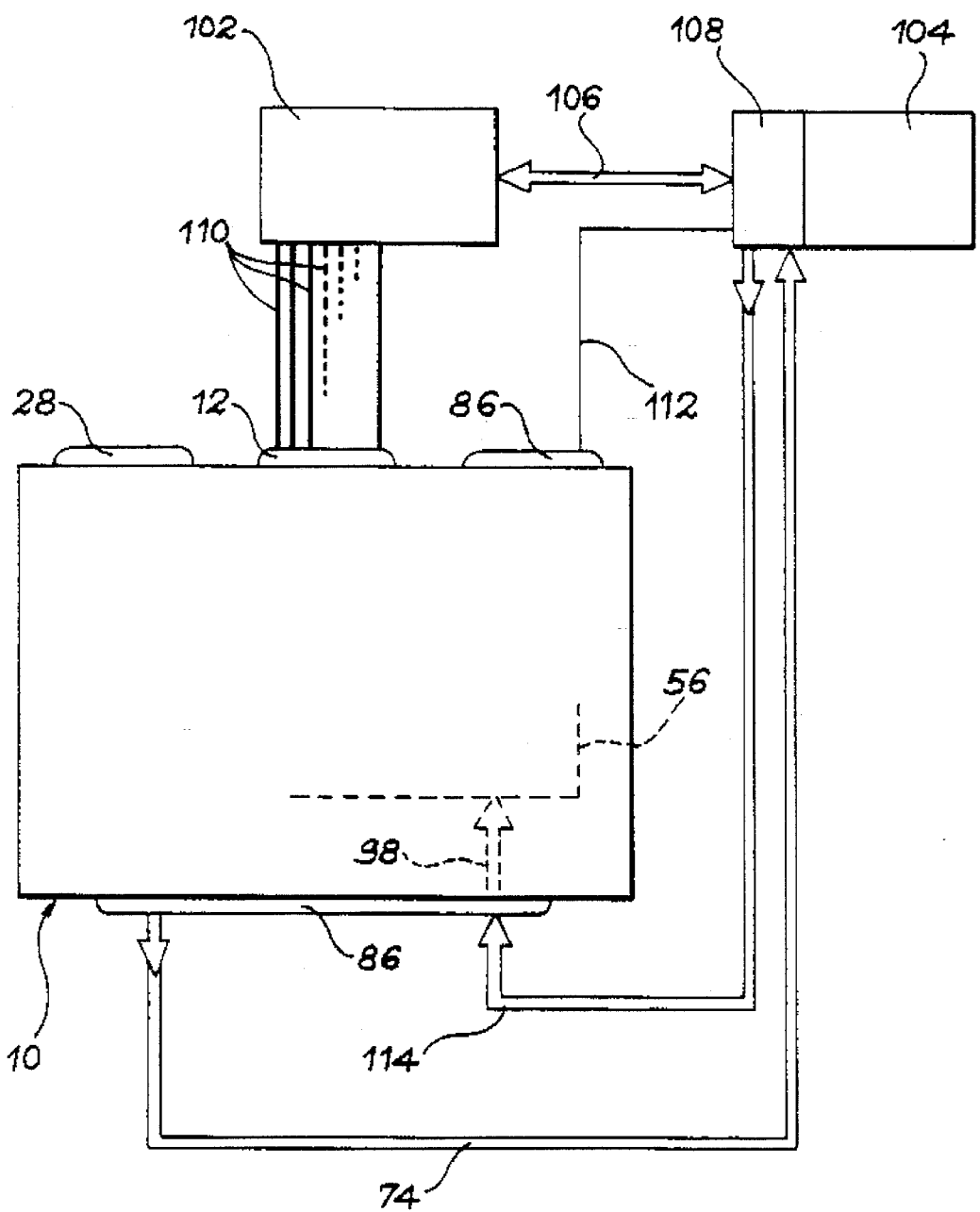

FIG. 2 the system of FIG. 1, associated with a calibration stand.

FIG. 3 an organization chart illustrating the operation of the system as a function of the input instructions which it receives.

The pressure measuring system according to the invention is entirely integrated into a box diagrammatically illustrated at 10 in FIG. 1. This box or case 10 is equipped with a first pneumatic connector 12 by which the system can be connected to different pressure intakes of an aircraft 11 by flexible tubes 13.

Within the box 10, the pneumatic connector 12 is connected by n (e.g. 28) measuring channels 16 to n transducers 14. In addition, the pneumatic connector 12 is connected within the box 10 to a common pressure reference line 18 and to a blowing line 20. When the flexible tubes 13 are connected to the pneumatic connector 12, all or most of the n measuring channels 16 communicates with the pressure intakes to be checked of the aircraft 11. The common pressure reference line 18 communicates with a static reference pressure. The latter can in particular be atmospheric pressure or the pressure prevailing in a calm area 22, where there is a local pressure close to static pressure. The blowing line also communicates with a dry compressed air generator 24.

When there are unused measuring channels 16, as illustrated in FIG. 1, they constitute standby channels making it possible to continue the measurements in the case of a failure of one or more of the transducers 14. Outside the box 10, said unused channels 16 are connected by flexible tubes 26 to a second pneumatic connector 28 equipping the system box 10.

In order to avoid the inversion of the pneumatic connectors 12 and 18 during connection operations, they have locating pins and different colours. The insertion of the mobile part of each connector is facilitated by the presence thereon of a central, prepositioning lug. In addition, the insertion of the flexible tubes 13 on said mobile part is facilitated by the staggering of the length of the rigid tubes on which they are fitted from the centre to the outside.

The transducers 14 connected to the n measuring channels 16 are membrane-type differential pressure transducers. Their sensitive element is constituted by a silicon membrane, whose opposite faces are respectively subject to the pressure in the corresponding measuring channel 16 and to the reference pressure admitted by the common pressure reference line 18. The deformation of the membrane is measured by a piezoresistive gauge bridge produced by microetching on the membrane. Therefore each of the transducers 14 supplies an electric signal representing the difference between the pressure prevailing in the corresponding measuring channel 16 and the reference pressure carried by the line 18.

The transducers 14 can be identical in the case where numerous measurements have to be simultaneously performed. In the opposite case, transducers having different measuring ranges can be grouped within the box 10.

Advantageously, a cavity 30 containing a drying product is placed in the common pressure reference line 18, in order to eliminate any trace of moisture liable to pollute the corresponding face of the transducers 14.

The box 10 of the pressure measuring system also contains a motorized multichannel valve 32 placed on the measuring channel 16 between the pneumatic connector 12 and the pressure transducers 14.

More specifically, the multichannel valve 32 is a spool-type valve having two circuits. An electric control motor 34 actuates an endless screw, which pushes or pulls the spool-type valve. An end of travel contact 46 gives information on the true position of the valve.

The number of channels of the multichannel valve 32 can be equal to or greater than the number of transducers 14. Thus, in the present embodiment having 28 measuring channels 16 and 28 transducers, the multichannel valve 32 can have 32 channels. An identical valve with 32 channels can also be used in a system having 32 transducers. On each of its channels, the multichannel valve 32 has a first valve 36 and a second valve 38.

The valves 36 and 38 can occupy a so-called measuring position 1, in which the measuring channels 16 communicate with the pressure transducers 14 corresponding thereto. When the number of channels of the multichannel valve 32 exceeds the number of measuring channels 16, as illustrated in FIG. 1, the valves 36 and 38 not used for the measuring channels 16 are connected by a tube 40 to all the channels of the second connector 28 so that, in said measuring position 1, the unused measuring channels 16 communicate with the common pressure reference line 18.

The valves 36 and 38 can also occupy a so-called blowing position 2. In this position, the valves 36 connect the measuring channel 16 to a blowing line 20. Consequently the dry air supplied by the dry compressed air generator 24 is injected into the aircraft pressure intakes, so as to be able to purge the water which may be contained therein. This operation prevents any freezing of water possibly present in the aircraft pressure intakes when the aircraft is at high altitude, so that measurements can still be performed in rainy weather.

In this blowing position 2, the valves 38 link each of the pressure transducers 14 with the common pressure reference line 18. Therefore the membranes of said transducers are subject to the reference pressure on each of their faces. As will be shown hereinafter, this makes it possible to measure the zero offset of each of the transducers.

When the number of channels of the multichannel valve 32 exceeds the number of measuring channels 16, as illustrated in FIG. 1, the blowing position 2 of the multichannel valve 32 leads to the isolation of the unused measuring channels 16 with respect to the blowing line 20. This avoids pressurized dry air from the blowing line being fed into the pressure reference line 18.

In order that the characteristics of the dry air injected into the aircraft pressure intakes causes no pollution within the pipes within which it flows, a filter 44 is placed in the blowing line 20 within the box 10.

In the not shown variant, where the number of channels of the multichannel valve 32 is equal to the number of transducers 14, the second pneumatic connector 28, within the box 10, communicates with a not shown electrovalve by the tube 40. This electrovalve fulfils the same function as the unused valves 36 and 38 of the multichannel valve 32 in the variant described hereinbefore. It is therefore controlled at the same time as the multichannel valve 32 and, in its measuring position 1, connects the tube 40 to the pressure reference line 18, whereas it isolates the transducers 14 and the pressure reference line 18 from the blowing line 20 in its blowing position 2.

With the group of n transducers 14 is associated a temperature probe 50 and a heating resistor 48, which makes it possible to maintain the temperature of the transducers 14 at a controlled and preferably controllable value, e.g. approximately 65°±2° C.

As a function of their measuring range, the transducers 14 are more or less sensitive to temperature variations. Thus, transducers having a small measuring range are sensitive to temperature variations of a few degrees, whereas a thermal compensation is not necessary for transducers having a larger measuring range. Therefore, in the first case, use is made of transducers which are temperature-compensated by an individual internal circuit.

It should be noted that the heating of the transducers 14 with the aid of the heating resistor 48, which automatically comes into operation during the energizing of the system, leads to an automatic regeneration of the drying product contained in the cavity 30.

Within the box 10, the approximate signals x representing the pressure measured by each of the transducers 14 are injected into a multiplexer 52, which transmits them in turn to the acquisition means 54 of an electronic microcontroller 56 also located in the box 10. More specifically, this transmission takes place across a 12 bit analog-digital converter 58 and its analog filtering circuit 60. The digital signals transmitted to the electronic microcontroller 56 by the converter 58 undergo a digital filtering in 62 before reaching the acquisition means 54. This digital filtering consists of calculating the mean of the signals supplied by each of the transducers 14 for ten successive acquisitions. In association with the analog filter 60, it contributes to an improvement in the quality of the signal-to-noise ratio.

An non-volatile memory 64 makes it possible to store, for each of the transducers 14, the values of a first sensitivity correcting coefficient A and a second zero offset correcting coefficient B. This memory 64 also contains the address of the transducer used for each measuring channel. The modification of this address makes it possible to replace one transducer by another transducer in the case where there are unused transducers.

The electronic microcontroller 56 also incorporates processing means 68 directly receiving the x approximate pressure measurement signals from the acquisition means 54, as well as the corresponding correcting coefficients A and B stored in the memory 66. For each of the approximate pressure measurement signals x from each of the transducers 14, the processing means 68 multiplies said signal x by the sensitivity correcting coefficient A and add thereto the zero offset correcting coefficient B. Thus, the signals passing out of the processing means 68 have, in principle, the same theoretical sensitivity and no zero offset (except in the case where they correspond to inoperative transducers, as will be shown hereinafter).

The corrected pressure signals passing out of the processing means 68 undergo formatting in a formatting means 70, such as an ARINC 429 formatting means also located in the box 10, but outside the electronic microcontroller 56. An emitter 72, such as an ARINC 429 emitter, then supplies the thus formatted pressure signals to the outside of the box 10 by a series bus 74. The format of the output informations can be different, as a function of the needs of the user. The assembly comprising the formatting means 70 and the emitter 72 constitutes the supply means for the informations processed by the electronic microcontroller 56.

By means of an analog input 76, the electronic microcontroller 56 also receives signals respectively supplied by the end of travel contact 46 and by the temperature probe 60. The signal supplied by the end of travel contact 46 is transmitted to valve control means 78. Moreover, the signal supplied by the temperature probe 60 is transmitted to thermal checking means 80. The means 78 and 80 form part of the electronic microcontroller 56 and respectively control the electric motor 34 and the heating resistor 48 across two power circuits 82,84 respectively.

The case 10 also has an electrical connector 86 equipped with four control lines 88 for receiving control instructions in the form of logic levels. These control instructions can in particular be delivered by at least one control box 90 located outside the case 10.

Within the case 10, the control lines 88 traverse input circuits 92, which are filtering circuits making it possible to prevent electrical interference being interpreted erroneously as instructions. After traversing these input circuits 92, the control lines 88 are connected to a digital input 94 of the electronic microcontroller 56.

Before being exploited so as to configure the system, the instructions applied to the digital input 94 by the control lines 88 pass through the system state auto-monitoring means 96. Said means 96 also receive the signals supplied by the end of travel contact 46 and by the temperature probe 50 to the analog input 76 before said signals are respectively exploited by the valve control means 78 and the thermal checking means 80.

The system state auto-monitoring means 96 permanently perform a certain number of checks, which relate both to the internal parameters of the system and the instructions received by the same. The informations supplied by the means 96 are directly transmitted to the formatting means 70, so that possible errors detected by said means 96 form the object of the supply of informations of a corresponding nature to the outside of the box 10.

In the embodiment described, the different functions fulfilled by the electronic microcontroller 56 (means 54,68, 78,80 and 96) are performed by software. However, these functions can also be performed by conventional electronic circuits.

Within the box 10, a digital link 98 accessible from the outside makes it possible to modify the programming and data used by the microcontroller 56. As will be shown hereinafter, it also permits the recalibration of the transducers 14 in the laboratory.

In the embodiment illustrated in FIG. 1, the bus 74 and the digital link 98 are grouped, with the control lines 88, on the electrical connector 86. However, a different arrangement could also be adopted.

The operation of the system described hereinbefore relative to FIG. 1 will now be described in connection with the pressure measurements to be performed on the pressure intakes of an aircraft 11, during ground or flight testing of the latter.

It is firstly pointed out that different systems identical to that diagrammatically illustrated in FIG. 1 can be simultaneously used, bearing in mind the large number of pressure intakes to be checked on an aircraft. All the systems are simultaneously controlled from the box or boxes 90. The informations supplied by the series bus 74 of each pressure measuring system are recorded and/or processed directly by an external system, which does not form part of the invention.

Contrary to what is diagrammatically illustrated in FIG. 1, the pressure measuring systems integrated into their small boxes 10 are installed on the aircraft 11 and the first pneumatic connector 12 is connected to the closest pressure intakes by flexible tubes 13. If there are unused transducers 14, the corresponding measuring channels 16 are connected to the second pneumatic connector 28 by flexible tubes 26. The control box or boxes 90 make it possible to apply to three of the control lines 88 logic signals which configure the system in a measuring state, a blowing state, a test state or a calibration state.

In the measuring state, the multichannel valve 32 occupies its measuring position 1, in which each of the aircraft pressure intakes communicates with one of the system pressure transducers 14. The approximate pressure values x measured by the transducers 14 are transmitted in turn to the processing means 68 by the multiplexer 52 after having been digitized and filtered.

In these means 68, they are corrected as a function of the coefficients A and B kept in the non-volatile memory 64 in accordance with the formula:

corrected value=Ax+B

The corrected pressure values are then converted to ARINC 429 format, so that their direct exploitation is possible.

In the blowing state, the multichannel valve 32 occupies its blowing position 2. Dry air from the compressed air generator 24 is consequently injected into the aircraft pressure intakes. The passage into this state prior to a measurement avoids the freezing of water in the pressure intakes in rainy weather. It should be noted that the transducers 14 are then connected to the common pressure reference line 18.

The test state makes it possible to individually test each transducer, so as to detect any faults and guarantee the quality of the measurement. This state is associated with the blowing state, so that the transducers 14 are connected to the pressure reference line 18 on the two faces of their membranes. Under these conditions, the signal supplied by each of the transducers corresponds to the zero offset of said transducer.

In the test state, the system checks that after correction by the processing means 68, the signal supplied by each of the transducers 14 has a corrected zero offset compatible with the precision of the system, i.e. below an admissible offset threshold e.g. equal to ±0.5% of the measurement range. In the opposite case, the measurement given by this transducer is invalid, which may mean that the transducer is inoperative, or requires recalibration. The result of this test (valid or invalid measurement) is transmitted by the bus 74 in the form of a code added to the relative information to the transducer.

The calibration state makes it possible to correct the zero offset coefficient B of each transducer. This correction extends up to 5 to 6 months the validation of the measurements of the etched silicon membrane transducers 14, within the limitation of ±0.5% of the measurement range, it being borne in mind that the most significant drift of this type of transducer relates to the zero offset.

The calibration state can only be established if the system is also in its blowing state and in its test state. Thus, calibration can only take place if the transducers 14 are connected to the pressure reference line 18 and if the approximate signals supplied by the transducers are corrected by the processing means 68.

In this calibration state, the zero shift of each of the corrected pressure signals leaving the processing means 68 is measured, so as to establish a new value for the zero offset coefficient B.

The value given to the zero offset coefficient B is limited to a given maximum value chosen so as to permit the detection of inoperative transducers, when the system is in its test state. Thus, an inoperative transducer has a high zero offset, which exceeds ±15% of the measurement range. By limiting the zero offset coefficient B to a maximum value e.g. equal to ±15% of the measurement range, during the correction of this coefficient performed in the calibration state, deliberately a zero offset is created for all the corrected pressure signals corresponding to inoperative transducers. When the system occupies its test state, the detection of the zero offset gives information on whether certain of the transducers 14 are inoperative.

As is very diagrammatically illustrated by FIG. 2, the pressure measuring system according to the invention can be configured in a calibration state making it possible to initially determine and then at relatively spaced time intervals (5 to 6 months on average), the values of the coefficients A and B for each of the transducers.

This calibration operation is performed in the laboratory using an existing calibration stand. The latter comprises a pressure generator 102, controlled by a computer 104, across a link 106 and interfaces 108.

To make it possible to carry out the calibration, the pressure generator 102 is connected by tubes 110 to all the channels of the connector 12 of the pressure measuring system. In addition, there is an electrical connection 112 between the interface 108 and the electrical connector 86, so that an instruction making it possible to configure the system in its calibration state can be supplied by the computer 104 to said system.

The series bus 74 is also connected to the interface 108, so that the signals supplied by the system are transmitted to the computer. It should be noted that in this calibration state, the values of the pressures measured by the transducers 14 are not corrected by the processing means 68. Finally, a digital link 114, e.g. of the RS 232 type, links the interface 108 with a digital link 98, particularly in order to permit the transmission to the memory 64 of the values of the coefficients A and B established by the computer 104 and the addresses of transducers corresponding to these coefficients.

When the system is in its calibration state, the computer 104 can also check the state of the system, as well as the state of the different transducers, by analysing the informations supplied by the series bus 74. It can then assist maintenance and control the developments of the equipment.

In the described embodiment, the informations supplied by the pressure measuring system are sequentially emitted on the series bus 74, in the form of words, in accordance with a previously established order and at a preferably regulatable rate. For example, this rate can be up to several dozen measurements per transducer and per second.

Each word train consists of n "pressure" words (one for each of the measuring channels 16), a "state" word containing informations supplied by the means 96 for the auto-monitoring of the internal state of the system and a "temperature" word containing the temperature value of the transducers 14.

Each word is in the form of a bit train successively containing a label making it possible to identify this word, a data field containing the actual information and a state code.

For the "pressure" words, the data field represents the value of the pressure and the state code indicates the state of the corresponding transducer (normal or out of tolerance).

For the "state" word, the data field contains the results of various checks permanently performed by the system state auto-monitoring means 96. For example, when a bit passes from 0 to 1 in this data field, this means that a fault has been detected in the check corresponding to this bit. Errors or faults such as an abnormal temperature of the transducers 14, an incorrect position of the slide of the multichannel valve 32, an error in the instructions received by the system ("test" requested in "measurement", or "calibration" requested without "test") etc. are therefore known at all times.

For this "state" word, the state code indicates the state in which the system is located (measurement, blowing or test, calibration, or general fault).

Finally, the data field relative to the "temperature" word represents the value of the temperature and the state code relative to said word indicates that the temperature of the transducers is normal, deteriorated (e.g. between 80° and 95° C.) or incorrect (e.g. below 70° C. or above 95° C.).

In the particular embodiment described, in which the informations are supplied to the outside in ARINC 429 format, each word is formed by 32 bits. Bits 1 to 8 then form a label of the words, which is octal-coded. Bits 11 to 28 constitute the data field of the word and bits 30 and 31 its state code. Bits 9 and 10 are not used. Finally, bit 29 represents the sign of the value contained in the data field for "pressure" words and bit 32 is 0 or 1 depending on whether the sum of the bits of the word is even or uneven.

In the case of "pressure" words, bits 11 to 27 represent the two complementary binary-coded pressure value and bit 28 represents the measurement range. In the case of the "temperature" word, only bits 21 to 28 are used and they represent the pure binary-coded temperature value. Finally, in the case of the "state" word, only bits 16 to 28 are used and each of them corresponds to a possible operating malfunction.

The different functions fulfilled by the pressure measuring system according to the invention are controlled by the software of the electronic microcontroller 56, as a function of instructions applied to the control lines 88, in a manner which will now be described with reference to the organization chart of FIG. 3.

Following the initialization of the system (stage 116) and at the start of each cycle, the system systematically performs a certain number of tasks symbolized by stages 118, 120, 122 and 124 in FIG. 1, no matter what the state or configuration of the system.

These systematic tasks comprise the acquisition of external instructions (stage 118), the thermal checking of the transducers 14 performed by the heating resistor 48 as a function of instructions emitted by the thermal checking means 80 sensitive to the signals supplied by the temperature probe 50 (stage 120), the auto-monitoring of the state of the system performed by the means 96 (stage 122) and the acquisition of approximate pressure measurements x given by the transducers 14 (stage 124).

To these tasks, which are independent of the state or configuration of the system, are added, at the start of each cycle, the optional control of the motor 34 making it possible, if necessary, to change the state of the multichannel valve 32 between its measurement state and its blowing state, as a function of the instructions gathered in stage 118. This task is identified by the stage 126 in FIG. 3 and is located between the thermal checking stage 120 and the system state auto-monitoring stage 122.

Following the acquisition of each approximate pressure measurement, the system checks in 128 as to whether the calibration stand is or is not connected to the connector 86. In the absence of a stand, the system calculates in 130 the corrected pressure value as a function of the corresponding coefficients A and B stored in the memory 64.

The system then checks in 132 if a test instruction has or has not been applied to the control lines 88. In the absence of such an instruction, the corrected pressure value is directly transmitted at 134 to the formatting means 70 and then to the emitter 72, in order to be emitted on the series bus 74 in the form of the corresponding "pressure" word.

Following the emission of each "pressure" word, the system checks at 136 if there are still "pressure" words to be emitted. If the n "pressure" words have not been emitted, there is a return to acquisition stage 124 in order to perform the same operations on all the pressure values supplied by the transducers.

When all the corrected pressure values have been emitted at 134, at 138 the system emits the "state" word and the "temperature" word before recommencing a new cycle.

When the system detects at 128 the presence of a calibration stand, the approximate pressure values acquired in 124 are directly transmitted to the formatting means 70 in order to be emitted at 134 without undergoing any correction. As shown in FIG. 3, the "pressure" words, as well as the "state" and "temperature" words are then transmitted to the calibration stand 102, 104 by the series bus 74 and the stand transmits to the memory 64 the corrected values of the coefficients A and B, for each transducer, by the link 114.

In the case where a test instruction is identified at 132, the system checks at 134 if a calibration instruction has or has not been applied to the control lines 88. In the affirmative, the system compares in 136 the corrected pressure value calculated in 130 with the previously established, admissible drift threshold (e.g. ±0.5 of the measurement range). As a function of the result of this comparison, the system allocates to the corresponding pressure value its appropriate state code (normal or out of tolerance). This stage, illustrated in 138 in FIG. 3, is followed by the emission in 134 of the corresponding "pressure" word, having a state code optionally corrected by the test.

When a calibration instruction is also applied to the system, the comparison performed at 136 is preceded by a stage, illustrated at 140 in FIG. 3, during which the corrected pressure calculated at 130 makes it possible to acquire a new value of the corresponding coefficient B, cancelling out said corrected pressure (the system then also being in the blowing state, as indicated hereinbefore). In this acquisition stage of the coefficient B, it is pointed out that the value of this coefficient is limited to a given maximum value, e.g. equal to ±15% of the measurement range.

The description given hereinbefore has made obvious the numerous advantages offered by the pressure measuring system according to the invention compared with the prior art systems. Thus, the integration of the system into a small box requiring no other equipment with the exception of a control switch makes its use particularly easy on an aircraft being tested. Moreover, the system is entirely automatic and its utilization on the aircraft can be carried out by an untrained operator.

In the particular configuration described, the system according to the invention is electrically compatible with the aeronautical environment, as well as existing ground maintenance and alarm control systems. Moreover, it is able to withstand the most severe conditions as regards temperature, vibrations, overvoltage, micro-cuts, electromagnetic emissions, etc. liable to be encountered on an aircraft. Moreover, the fitting and removal of the system with respect to the aircraft are facilitated by the special design of the pneumatic connectors.

With regards to the quality and efficiency of the measurements, they are very significantly improved compared with those of existing systems. Thus, the measuring system according to the invention makes it possible, as a result of its blowing state, to carry out measurements in all weathers. The existence of a calibration state makes it possible to extend the period of use of the system up to at least five months without maintenance or calibration on the stand, in an automatic manner and without intervention and without the addition of any external equipment. Moreover, maintenance is reduced and defect analysis facilitated by the existence of permanent internal auto-checks.

The system also has no moving parts during the measurement, so that there is no risk of leaks which might falsify the measurements.

Finally, the system can be calibrated automatically, without any intervention taking place on the equipment, using most existing calibration stands.

Obviously, the embodiment described can undergo various modifications without passing outside the scope of the invention. Thus, the pressure transducers can optionally be regulated to a different temperature. It has also been seen that the number of channels of the valve can be equal to the number of transducers and that the system is then equipped with a complementary electrovalve controlled by the system at the same time as the valve.

I claim:

1. A multichannel pressure measuring system, housed in a single box, comprising:

a first pneumatic connector;

n pressure transducers adapted to provide n pressure measurements;

n measuring channels connecting the first pneumatic connector to each pressure transducer;

multiplexing means for receiving said n pressure measurements from said n pressure transducers;

processing means responsive to said n pressure measurements, through the multiplexing means for multiplying each pressure measurement by a corresponding first, sensitivity correcting coefficient A, and adding to each pressure measurement a corresponding second, zero shift correcting coefficient B, in order to supply, in turn, n corrected pressure measurements; and supply means for providing output data from said box representative of said n corrected pressure measurements.

2. The system according to claim 1, wherein said box further comprises auto-monitoring means for auto-monitoring the operating state of the system, and for providing data to said supply means representative of a satisfactory operating state for the pressure measuring system.

3. The system according to claim 1, wherein said n pressure transducers are differential pressure transducers having a common pressure reference line adapted to be connected to an external reference pressure source.

4. The system according to claim 3, wherein the differential pressure transducers are membrane transducers and wherein said system further comprises heating means in the vicinity of said membrane transducers and temperature control means for actuating said heating means, with said supply means further providing temperature data representative of the temperature of the transducers.

5. The system according to claim 3, wherein a motorized multichannel valve is positioned upstream of the transducers on the measuring channels, and adapted to occupy either a measuring position, in which an input of each measuring channel is connected to a corresponding transducer, or a blowing position in which the input of each measuring channel communicates with a blowing line connected to an external, dry compressed air generator and in which an input of each transducer is connected to the common pressure reference line.

6. The system according to claim 5 comprising an electric motor for controlling the multichannel valve.

7. The system according to claim 5 further including filtering means in the blowing line.

8. The system according to claim 5, wherein said n measuring channels includes standby measuring channels with said system further comprising a second pneumatic conductor adapted to be connected to the standby measuring channels for communicating with the common pressure reference line when the motorized multichannel valve occupies its measuring position and being isolated when said valve occupies its blowing position.

9. The system according to claim 5 further comprising automatic grading means to acquire, for each of the pressure transducers, the second, zero shift correcting coefficient B, for which the corrected pressure measurement supplied by the processing means is zero, when the motorized multichannel valve occupies its blowing position.

10. The system according to claim 9, wherein the automatic grading means incorporate means for limiting the maximum attainable value of said second coefficient B to a preselected threshold value.

11. The system according to claim 10 comprising test means for comparing, for each of the pressure transducers, the corrected pressure measurements supplied by the processing means when the motorized multichannel valve occupies its blowing position with an admissible drift threshold and for transmitting said comparison as information to the supply means with said test means being responsive to said preselected threshold value for invalidating said information when the corrected pressure measurement exceeds said threshold.

12. The system according to claim 11 comprising control means able to place the system in at least one of the following states:

a measuring state wherein the multichannel valve occupies its measuring position, a blowing state, in which the multichannel valve occupies its blowing position, a test state associated with the blowing state in which the processing means and test means are actuated; and a grading state associated with the blowing state and the test state in which the automatic grading means are actuated.

13. The system according to claim 12 further comprising a digital calibration link located within the box, means for storing the first coefficient A and the second coefficient B, and a computer of a calibration stand connected to said calibration link for computing said first and second coefficient when the transducers are subject to predetermined pressure values.

14. The system according to claim 13, wherein the control means are also adapted to place the system in a calibration state with the pressure measurements supplied by the transducers directly transmitted to the supply means which are then connected to the computer of the calibration stand.

15. The system according to claim 12, wherein the control means incorporate control lines able to receive logic instructions from outside the box.

16. The system according to claim 4, wherein drying means are placed in the common pressure reference line.

17. The system according to claim 16, wherein the drying means include a drying product automatically regenerated by using the heating means.

18. The system according to claim 1, wherein the processing means are connected to the pressure measurement acquisition means through analog filtering means, an analog-digital converter and digital filtering means.

19. A process for measuring the pressures supplied to n pressure transducers by n measuring channels within the housing of a single box, comprising the steps of:

simultaneously deriving within said single box an approximate measurement of pressure from each of said n pressure transducers and supplying in turn, output data from said box representative of said pressure measurements, wherein, prior to supplying the output data representative of the pressure measurements, each of said approximate pressure measurements is processed by multiplying it by a corresponding first, sensitivity correcting coefficient A and by adding to it a corresponding second, zero shift correcting coefficient B.

20. The process according to claim 19 further comprising the steps of monitoring the operating state of the pressure measuring system in said box and supplying data representing a satisfactory operating state for the system.

21. The process according to claim 19, wherein said pressure transducers consist of n differential, membrane-type pressure transducers having a common reference pressure for providing said approximate pressure measurement with each approximate pressure measurement representing the difference between the pressure in the measuring channel to which the pressure transducer is connected and the reference pressure.

22. The process according to claim 19 further comprising the steps of injecting dry compressed air into the n measuring channels, while linking the transducers with the common reference pressure for switching from a measuring state to a blowing state.

23. The process according to claim 22, wherein, when the measuring system is in its blowing state, it is adapted to carry out a function test on each transducer, during which the pressure measurement is corrected by the coefficients A and B with an admissible drift threshold.

24. The process according to claim 23, wherein, when a function test is performed on each transducer, the measuring system is adapted to perform a grading of said transducer by calculating and storing the second coefficient B for which the pressure measurement corrected by the coefficients A and B is zero.

25. The process according to claim 24, wherein, when a grading is performed, the second coefficient B is limited to a given maximum value.

26. The process according to claim 21, wherein the values of the coefficients A and B are computed by a computer in an external calibration stand on the basis of the approximate pressure measurement supplied by said transducer, the calibration stand injecting these values into a memory within the box.

* * * * *